United States Patent
Sugiura et al.

(10) Patent No.: US 8,963,381 B2
(45) Date of Patent: Feb. 24, 2015

(54) ONE-PIECE RESIN COMPONENT FOR DYNAMOELECTRIC MACHINE AND MANUFACTURING METHOD USING THE SAME

(75) Inventors: Hiroki Sugiura, Toyohashi (JP); Hiroaki Honma, Kosai (JP); Shinya Sugiura, Kosai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 770 days.

(21) Appl. No.: 13/242,046

(22) Filed: Sep. 23, 2011

(65) Prior Publication Data

US 2012/0080961 A1 Apr. 5, 2012

(30) Foreign Application Priority Data

Oct. 1, 2010 (JP) ................................ 2010-223944

(51) Int. Cl.
*H02K 5/22* (2006.01)
*B29C 37/00* (2006.01)
*B29C 45/17* (2006.01)
*H02K 15/14* (2006.01)
*H02K 7/116* (2006.01)

(52) U.S. Cl.
CPC ............ *B29C 45/1769* (2013.01); *H02K 15/14* (2013.01); *H02K 7/1166* (2013.01)
USPC .................. 310/43; 310/89; 29/596; 264/238

(58) Field of Classification Search
USPC .......... 310/89, 43; 29/596–598; 264/238, 157
See application file for complete search history.

(56) References Cited

U.S. PATENT DOCUMENTS

| | | | |
|---|---|---|---|
| 5,268,607 A * | 12/1993 | McManus | ........................ 310/89 |
| 6,073,746 A | 6/2000 | Oshiro et al. | |
| 6,637,838 B2 | 10/2003 | Watanabe | |
| 7,432,606 B2 | 10/2008 | Yamamoto et al. | |

FOREIGN PATENT DOCUMENTS

| | | | | |
|---|---|---|---|---|
| JP | 63-157636 A | 6/1988 | | |
| JP | 2005035242 A | * 2/2005 | ............. | B29C 45/27 |
| JP | A-2005-035242 | 2/2005 | | |
| WO | WO 2010092402 A1 | * 8/2010 | ............. | H02K 21/24 |

OTHER PUBLICATIONS

JP 2005035242 A machine translation, Jul. 14, 2014.*
Office Action dated Jun. 2, 2014 in the corresponding JP application No. 2010-223944 (with English translation).

* cited by examiner

*Primary Examiner* — Tran Nguyen
*Assistant Examiner* — Leda Pham
(74) *Attorney, Agent, or Firm* — Posz Law Group, PLC (57) ABSTRACT

In a one-piece resin component, a plurality of stackable resin portions is resin-molded integrally with a resin housing of a dynamoelectric machine and radially outwardly projects from the resin housing. Each the plurality of stackable resin portions is adapted to be stacked against a corresponding one of a plurality of stackable resin portions of another one-piece resin component that is generally identical to the one-piece resin component.

10 Claims, 4 Drawing Sheets

ONE-PIECE RESIN COMPONENT FOR DYNAMOELECTRIC MACHINE AND MANUFACTURING METHOD USING THE SAME

CROSS REFERENCE TO RELATED APPLICATION

This application is based on and incorporates herein by reference Japanese Patent Application No. 2010-223944 filed on Oct. 1, 2010.

BACKGROUND OF THE INVENTION

1. Field of the Invention

The present invention relates to a one-piece resin component for a dynamoelectric machine and a manufacturing method that uses such a one-piece resin component.

2. Description of Related Art

According to a previously known manufacturing method of an article (e.g., a tandem pneumatic booster), a housing (e.g., a shell) of the article is configured into a shape that enables easy stacking of such a housing with one or more of such a housing to form a stack of the housings, and the stack of the housings is transferred together to an assembly line at once to allow a reduction in transferring costs of the components and thereby to allow a reduction in the manufacturing costs of such an article (see, for example, JP2002-321610A that corresponds to U.S. Pat. No. 6,637,838B2).

In a technical field of a dynamoelectric machine (e.g., a geared electric motor), a gear housing of the dynamoelectric machine, which receives a worm wheel and a worm, is mass-produced through a resin molding process in a molding factory. Then, the mass-produced gear housings are transferred to an assembly factory to assemble the gear housings with the other components to produce the dynamoelectric machines. At the time of transferring the gear housings from the molding factory to the assembly factory, the gear housings are stacked one after another in a stacking direction (axial direction) to form a stack of the gear housings. In order to facilitate the stacking of the gear housings, it is conceivable that a first side engaging portion and a second side engaging portion (serving as stackable engaging portions) are directly formed in a first axial end part and a second axial end part, respectively, of a wheel receiving portion of the gear housing, which receives the worm wheel. The first side engaging portion of one of the gear housings is engaged with the second side engaging portion of another adjacent one of the gear housings to stack these gear housings together in the stacking direction, and this process is repeated for the rest of the gear housings in each stack. Then, the stacks of the gear housings are transferred from the molding factory to the assembly factory.

Lately, there are demands of increasing the rigidity of the gear housing and of implementing required functions of the gear housing. In order to satisfy these demands, a shape of the gear housing tends to be complicated. When the first side engaging portion and the second side engaging portion are directly formed in the gear housing, a design freedom of the gear housing is disadvantageously limited, and it is often difficult to implement the required functions in the gear housing. Furthermore, in a case where the first side engaging portion and the second side engaging portion are not formed in the gear housing, a cushion member needs to be placed between each adjacent two of the stacked gear housings to limit wobbling of the stacked gear housings during the transportation. In such a case, the cushion member is additionally required, and a step of placing the cushion member is additionally required. Furthermore, the stacked gear housings may not be neatly aligned in the stacking direction. That is, some of the stacked gear housings may protrude laterally on the left side or the right side or on the front side or the rear side. Therefore, the stacked gear housings tend to occupy a larger space in a transfer case (container), which accommodates the stacked gear housings for the transportation purpose. Thus, the number of the gear housings, which are receivable in the transfer case, is disadvantageously reduced.

SUMMARY OF THE INVENTION

The present invention is made in view of the above disadvantages.

According to the present invention, there is provided a one-piece resin component for a dynamoelectric machine. The one-piece resin component includes a resin housing and a plurality of stackable resin portions. The resin housing is configured to form at least a part of a housing of the dynamoelectric machine. The stackable resin portions are formed integrally with the resin housing and radially outwardly project from the resin housing. Each of the plurality of stackable resin portions is adapted to be stacked in a stacking direction against a corresponding one of a plurality of stackable resin portions of another one-piece resin component that is generally identical to the one-piece resin component.

According to the present invention, there is also provided a manufacturing method. According to the manufacturing method, a plurality of one-piece resin components is molded from a resin material. Each of the plurality of one-piece resin components includes a resin housing and a plurality of stackable resin portions. The resin housing is configured to form at least a part of a housing of a dynamoelectric machine. The stackable resin portions are formed integrally with the resin housing and radially outwardly project from the resin housing. Then, the plurality of one-piece resin components is transferred after the molding thereof in a stacked state, in which the plurality of one-piece resin components is stacked in a stacking direction by stacking each of the plurality of stackable resin portions of each of the plurality of one-piece resin components against a corresponding one of the plurality of stackable resin portions of an adjacent one of the plurality of one-piece resin components.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
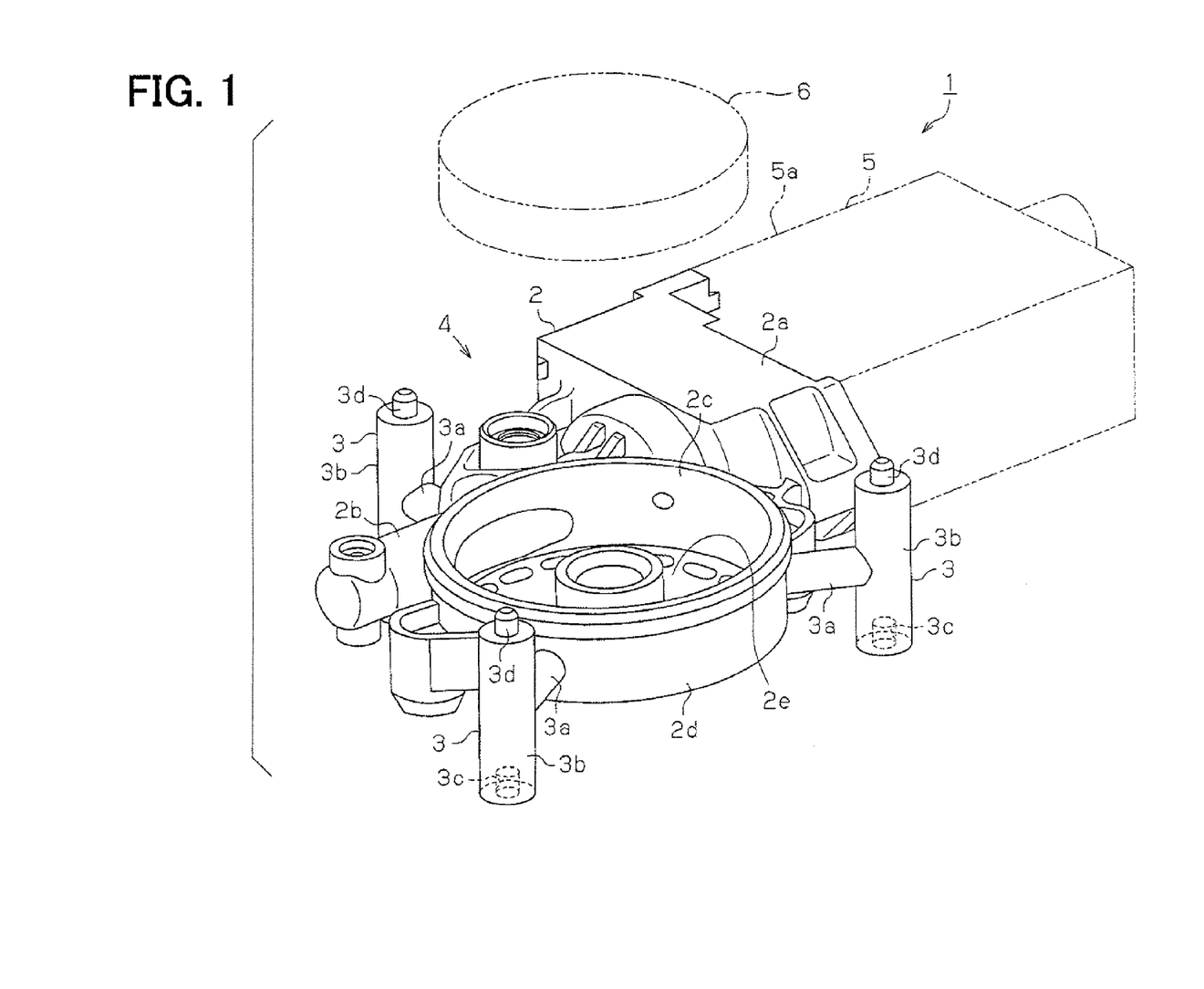
FIG. 1 is a perspective view showing a one-piece resin component of a dynamoelectric machine according to an embodiment of the present invention.

An embodiment of the present invention will be described with reference to FIGS. 1 to 4. FIG. 1 is a perspective view showing a one-piece resin component (also referred to as a one-piece resin article) 4, in which a plurality (three in this embodiment) of stackable resin portions 3 radially outwardly projects from a gear housing 2, which serves as a resin housing (molded resin component) of a dynamo-electric machine (e.g., a geared electric motor) 1.

The gear housing 2 includes a motor fixation portion 2a, a worm receiving portion 2b and a wheel receiving portion 2c. A motor housing 5a of a motor main body 5 of the dynamo-electric machine 1 (another component of the dynamoelectric machine) is installed to and is fixed to the motor fixation portion 2a of the gear housing 2 with, for example, screws, and the gear housing 2 and the motor housing 5a cooperate together to form a housing of the dynamoelectric machine 1. The worm receiving portion 2b is configured into an elongated cylindrical tubular body and extends from the motor fixation portion 2a to receive a worm (not shown), which is rotated upon receiving a rotational force of the motor main body 5. The wheel receiving portion 2c is configured into a cup-shape body and receives a worm wheel 6 that is meshed with the worm to reduce a rotational speed of the rotation transmitted from the motor main body 5 through the worm. An output shaft (not shown) is connected to a center part of the worm wheel 6 to output the rotation of the reduced speed. A diameter of a cylindrical peripheral wall (cylindrical tubular part) 2d of the wheel receiving portion 2c, which axially extends from a bottom wall 2e of the wheel receiving portion 2c, is set to be substantially larger than an axial length of the cylindrical peripheral wall 2d to receive the worm wheel 6, which is configured into a circular disk body having gear teeth along an outer peripheral part thereof.

Figure 2:
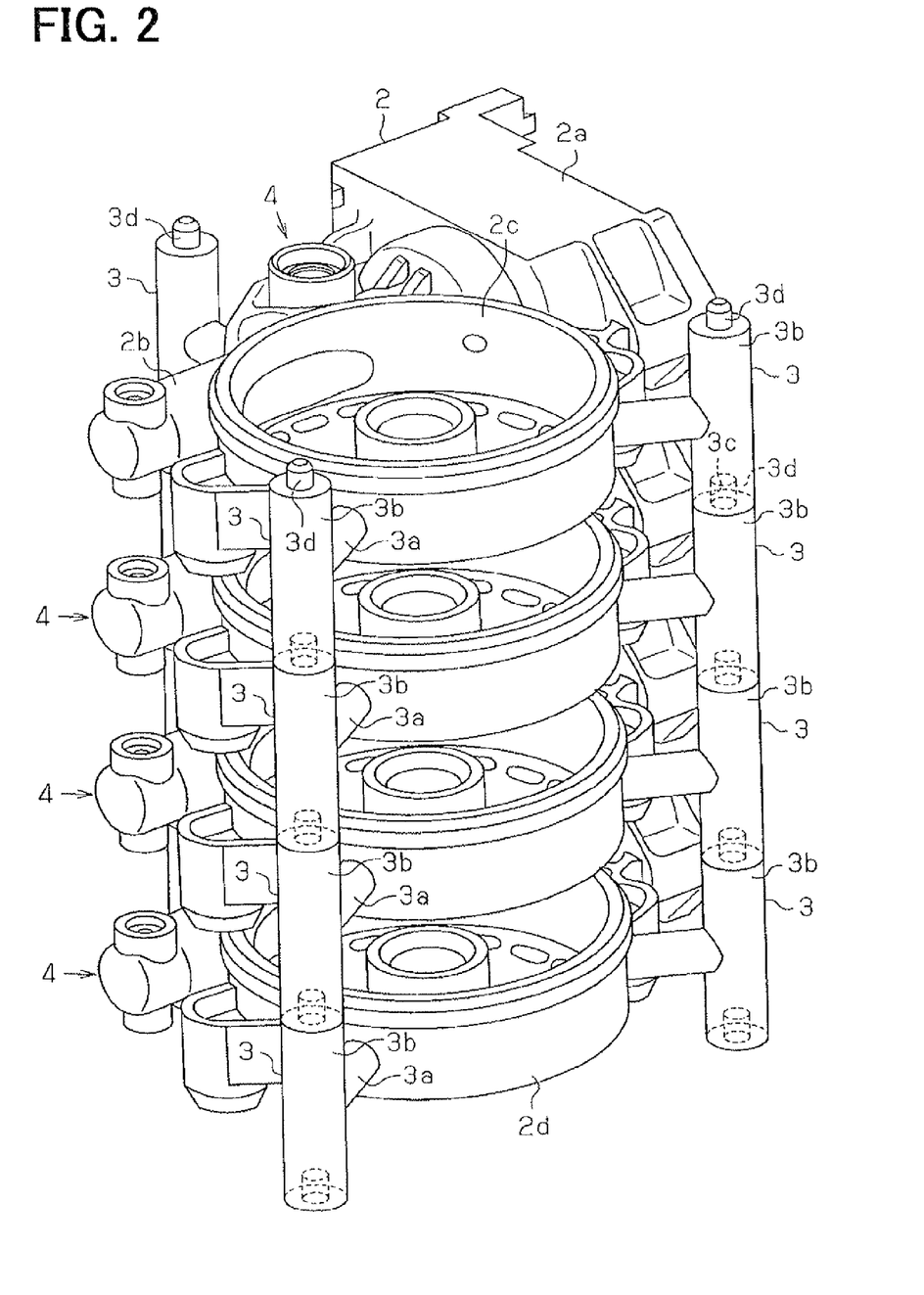
FIG. 2 is a perspective view showing a stack of one-piece resin components according to the embodiment.

As shown in FIG. 1, in the state immediately after the molding of the one-piece resin component 4, the stackable resin portions 3 radially outwardly project relative to the cylindrical peripheral wall 2d of the wheel receiving portion 2c and are circumferentially arranged one after another at generally equal intervals (about 120 degree intervals). Each stackable resin portion 3 includes an outer projection 3a and a support column 3b. The outer projection 3a radially outwardly projects relative to the cylindrical peripheral wall 2d. The support column 3b axially extends in an axial direction of the wheel receiving portion 2c from a radially outer end part of the outer projection 3a on both of an axially upper side and an axially lower side of the outer projection 3a in FIG. 2. As shown in FIG. 2, in a case where a plurality of one-piece resin components 4 needs to be stacked, the stackable resin portions 3 (more specifically, the support columns 3b) of each one-piece resin component 4 are stacked against the stackable resin portions 3, respectively, of another one of the one-piece resin components 4 in a stacking direction (axial direction).

An engaging recess (first engaging part) 3c is axially recessed and is formed in one end part of the support column 3b of each stackable resin portion 3, and an engaging protrusion (second engaging part) 3d is axially protruded and is formed in the other end part of the support column 3b, which is opposite from the one end part of the support column 3b in the stacking direction. The engaging recess 3c and the engaging protrusion 3d of each stackable resin portion 3 are axially placed outside of an axial extent of the cylindrical peripheral wall 2d of the wheel receiving portion 2c to facilitate the stacking of the stackable resin portions 3 of the one-piece resin components 4. Each adjacent two of the stacked one-piece resin components 4 are stacked one after another such that the engaging recesses 3c of the stackable resin portions 3 of one of the adjacent two of the stacked one-piece resin components 4 are engaged with the engaging protrusions 3d of the stackable resin portions 3 of the other one of the adjacent two of the stacked one-piece resin components 4 in the stacking direction (axial direction) to limit disengagement therebetween (i.e., between the engaging recesses 3c and the engaging protrusions 3d) in a direction perpendicular to the stacking direction. In the present embodiment, the engaging recess 3c is formed in the lower end part of the support column 3b (i.e., the end part of the support column 3b, which corresponds to the bottom wall 2e side of the wheel receiving portion 2c), and the engaging protrusion 3d is formed in the upper end part of the support column 3b (i.e., the end part of the support column 3b, which corresponds to the upper opening of the wheel receiving portion 2c). Alternatively, the engaging protrusion 3d may be formed in the lower end part of the support column 3b, and the engaging recess 3c may be formed in the upper end part of the support column 3b.

Next, a manufacturing method of the dynamoelectric machine, which includes the gear housing 2 (the resin housing), will be described.

The manufacturing method of the dynamoelectric machine of the present embodiment includes a molding step, a transferring step, an assembling step and a cutting step.

First of all, at the molding step, the one-piece resin component 4, in which the stackable resin portions 3 are formed integrally with the gear housing 2, is molded. The molding of the one-piece resin component 4 is performed through injection molding by filling a molten resin material into a molding die 10 shown in FIG. 3.

Figure 3:
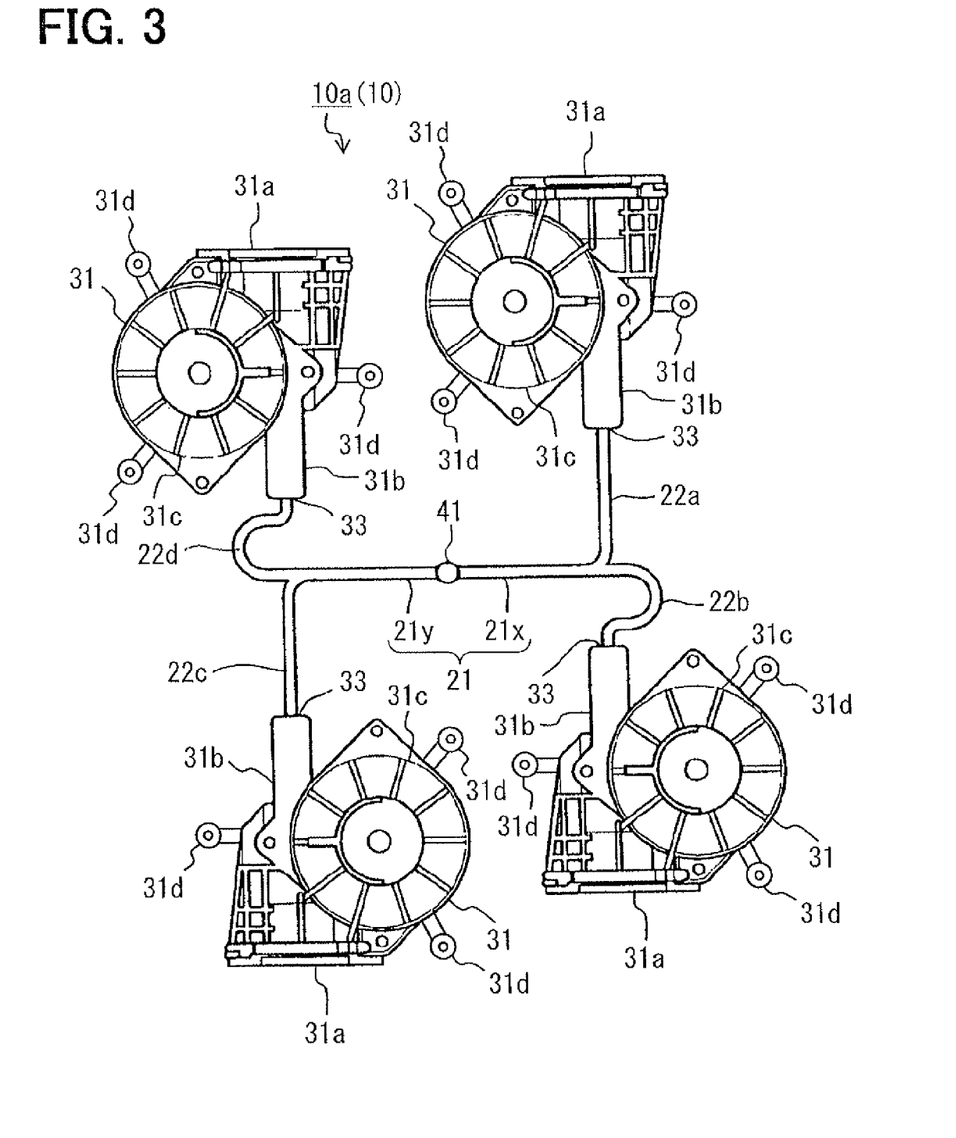
FIG. 3 is a schematic diagram showing a structure of a molding die, in which the one-piece resin components are molded.

The molding die 10 includes a movable die part 10a and a stationary die part (not shown). FIG. 3 shows a sprue 41, a main runner 21, a plurality of sub-runners 22a-22d, a plurality of gates 33 and a plurality of cavities 31 formed in the movable die part 10a of the molding die 10. In the present embodiment, the cavities 31 are generally identically configured, and each cavity 31 is provided to mold the one-piece resin component 4 therein. In this particularly instance, the number of the cavities 31 is set to be four to simultaneously mold four of the one-piece resin components 4 at once. The number of the cavities 31 may be modified to any other suitable number, depending on a need. Each cavity 31 is connected to the sprue 41 through the corresponding gate 33, the corresponding sub-runner 22a-22d and the main runner 21 (more specifically, a corresponding one of flow passages 21x, 21y of the main runner 21, which are located on one side and the other side, respectively, of the sprue 41) to receive the molten resin material from the sprue 41. Each cavity 31 includes a motor fixation portion molding part 31a, a worm receiving portion molding part 31b, a wheel receiving portion molding part 31c and three stackable resin portion molding parts 31d to mold the motor fixation portion 2a, the worm receiving portion 2b, the wheel receiving portion 2c and the stackable resin portions 3, respectively, of the corresponding one-piece resin component 4 upon receiving the molten resin material from the sprue 41. The motor fixation portion molding part 31a, the worm receiving portion molding part 31b and the wheel receiving portion molding part 31c cooperate together to serve as a resin housing molding part to mold the gear housing 2 (the resin housing).

Under certain conditions, a phenomenon, which is known as short-shot, may possibly occur in a narrow area (low profile area) of the cavity 31 and/or a furthermost area of the cavity 31, which is furthermost from the gate 33. When the short-shot occurs, one or more parts of the cavity 31 may not be filled with the resin material, thereby resulting in a defect in the one-piece resin component 4. In order to avoid the generation of the defect, which is caused by the short-shot, in the one-piece resin component 4, various molding conditions (e.g., the injection pressure of the molten resin material, the temperature of the molten resin material, the temperature of the molding die 10) need to be precisely controlled. In some cases, the injection pressure may exceed beyond an upper limit pressure to cause overpacking of the molten resin material into the cavity 31 when the injection pressure is not properly controlled. This overpacking may possibly cause damage to the molding die 10.

In the present embodiment, at least one (e.g., a lower right one of the lower right cavity 31 in FIG. 3) of the stackable resin portion molding parts 31d, in which the stackable resin portions 3 are molded, is placed furthermost from the gate 33 in the cavity 31 and has a relatively low profile. Thus, when the short-short occurs in the cavity 31, it will likely take place in the furthermost one of the stackable resin portion molding parts 31d. Since the stackable resin portions 3 are not the functional portions of the final product of the dynamoelectric machine, the generation of the defect caused by the short-shot in the stackable resin portions 3 is less critical in comparison to the generation of the defect caused by the short-shot in the functional portions (e.g., the wheel receiving portion 2c) of the final product of the dynamoelectric machine. Therefore, when the stackable resin portions 3 are provided in the one-piece resin component 4, it is possible to alleviate the need for the precise control of the molding conditions (e.g., the injection pressure of the molten resin material, the temperature of the molten resin material, the temperature of the molding die 10) while avoiding the occurrence of the short-shot in the wheel receiving portion 2c as well as the other functional portions (e.g., the worm receiving portion 2b and the motor fixation portion 2a) of the gear housing 2. Furthermore, even when the defect caused by the short-shot is generated in the stackable resin portions 3, the rest of the one-piece resin component 4 can be still properly used as the gear housing 2 as long as the defect caused by the short-shot is not generated in the rest of the one-piece resin component 4. This is particularly true in the case where the stackable resin portions 3 are cut off from the rest of the one-piece resin component 4 in the cutting step described in detail below, thereby leaving the impeccable gear housing 2 having no defect caused by the short-shot. In addition, the size and/or the configuration of the stackable resin portions 3 may be appropriately chosen such that the short-shot occurs in a less important part of the stackable resin portion 3, which does not affect the function of the stackable resin portion 3.

After completion of the filling of the molten resin material into each cavity 31, the molten resin material is cooled to solidify the same. Thereafter, the molded one-piece resin components 4 are removed from the cavities 31 upon opening of the movable die part 10a away from the stationary die part. Then, the one-piece resin components 4 are cut off from the unneeded resin parts, which correspond to the main runner 21, the sub-runners 22a-22d, the gates 33 and the sprue 41. Thereby, the molding of the one-piece resin components 4 at the molding step is completed.

Next, at the transferring step, the stackable resin portions 3 (support columns 3b) of the one-piece resin components 4 are stacked one after another to form a stack of the one-piece resin components 4 (see FIG. 2). Then, the stack(s) of the one-piece resin components 4 is transferred, i.e., is transported. In the present embodiment, the stackable resin portions 3 of the one-piece resin components 4 are stacked by inserting the engaging protrusions 3d of one of the one-piece resin components 4 into the engaging recesses 3c of the adjacent one of the one-piece resin components 4. This transferring may be from, for example, a molding factory, in which the one-piece resin components 4 are mass-produced, to an assembly factory, which has an assembly line for assembling the motor main body 5 and the worm wheel 6 to the gear housing 2. Alternatively, this transferring may be from a molding facility to an assembling facility in one factory. The stacks (see FIG. 2) of the one-piece resin components 4 may be arrayed in rows and columns in an undepicted transfer case (container), and this transfer case may be transferred from, for example, the molding factory to the assembly factory.

Figure 4:
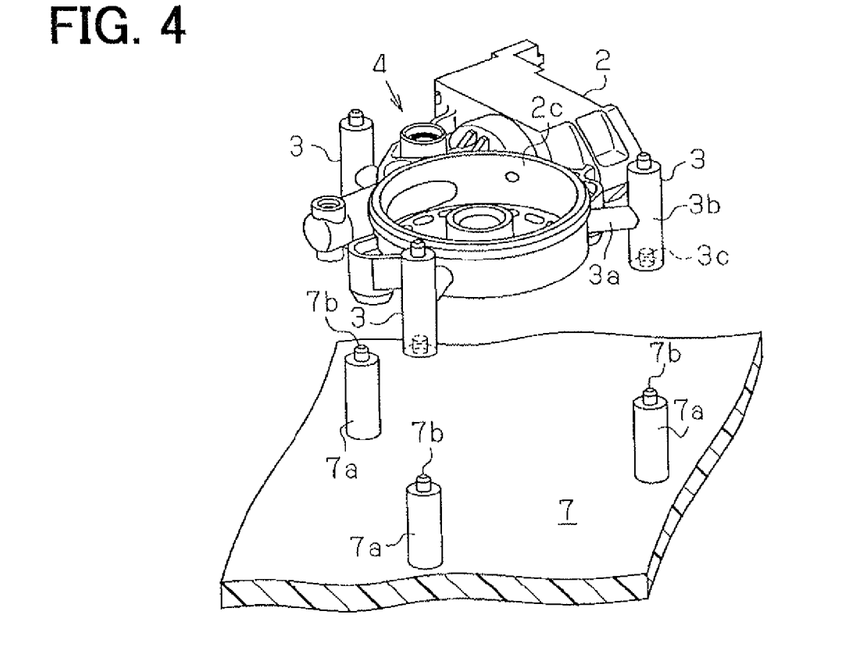
FIG. 4 is a perspective view showing an assembling step of the dynamoelectric machine of the embodiment.

Next, at the assembling step, the stackable resin portions 3 are used as a positional reference, and the other components are assembled to the gear housing 2. Specifically, in the present embodiment, as shown in FIG. 4, a plurality of reference mounts (stubs) 7a is placed upright on the assembly line 7, and the stackable resin portions 3 of the one-piece resin component 4 are placed on the reference mounts 7a, respectively. Then, a robot (not shown), which is configured to operate by using the reference mounts 7a as its operational positional reference, is used to assemble the other components to the gear housing 2. In the present embodiment, in the state where the stackable resin portions 3 are mounted to the reference mounts 7a, respectively, the worm wheel 6 (see FIG. 1) and a cover (not shown), which covers the wheel receiving portion 2c, are automatically assembled to the gear housing 2 by the robot. A protrusion 7b, which is similar to the engaging protrusion 3d, is formed at an upper end part of each of the reference mounts 7a, and the protrusion 7b is inserted into the corresponding engaging recess 3c to mount the stackable resin portion 3 to the reference mount 7a.

Thereafter, the cutting step may be performed before or after the assembling step upon completion of the transferring step. In the present embodiment, the cutting step is performed after the assembling step such that the stackable resin portions 3 are cut off from the rest of the one-piece resin component 4, thereby leaving the gear housing 2. In the present embodiment, the removed stackable resin portions 3, which are removed from the rest of the one-piece resin component 4, are recycled for later use as the material of the one-piece resin component 4.

Upon completion of the above steps, the manufacturing of the dynamoelectric machine is completed.

Next, advantages of the present embodiment will be described.

(1) At the molding step, the one-piece resin component 4, in which the stackable resin portions 3 radially outwardly project from the gear housing 2 (resin housing) of the dynamo-electric machine 1, is molded. Thereafter, at the transferring step, the one-piece resin components 4 are stacked through the stackable resin portions 3 to form the stacks of the one-piece resin components 4, and the stacks of the one-piece resin components 4 are then transferred. Therefore, it is not required to form the first side engaging portion and the second side engaging portion (common stackable resin portions) directly in the first axial end part and the second axial end part, respectively, of the wheel receiving portion 2c (more specifically, the cylindrical peripheral wall 2d of the wheel receiving portion 2c) to enable the stacking of the gear housings 2 unlike the previously proposed technique. Thus, it is possible to increase a degree of design freedom of the gear housing 2. Furthermore, even in a case of a gear housing, which has a shape that does not allow the formation of the common stackable resin portions in the gear housing, the gear housings can be stacked one after another by using the stackable resin portions 3 of the present embodiment, and the stacked gear housings can be transferred in this stacked state. Thus, the transferring of the gear housings can be eased. Also, according to the present embodiment, it is not required to provide the cushion member between each adjacent two of the stacked gear housings 2 to limit wobbling of the stacked gear housings 2 at the time of stacking the gear housings 2, and also it is possible to eliminate the step of placing the cushion member. Also, according to the present embodiment, the large number of the gear housings 2 can be easily arrayed in the rows and columns in the transfer case, and thereby the number of the gear housings 2 placed in the transfer case can be increased. Furthermore, the handling of the gear housings 2 (the one-piece resin components 4) before and after the transferring step is eased. Furthermore, it is possible to limit or minimize occurrence of contact between one of the gear housings 2 in one stack and an adjacent one of the gear housings 2 in the adjacent stack during the transferring step. Thus, it is possible to limit or minimize damage of the gear housings 2.

(2) The resin housing discussed above is the gear housing 2, which receives the gears (the worm and the worm wheel 6), so that the resin housing has the complicated shape, and thereby the stacking of the resin housings one after another is not easy. However, according to the present embodiment, the stackable resin portions 3 are provided to each resin housing, so that the resin housings can be easily stacked by using the stackable resin portions 3, and the stacked resin housings can be easily transferred.

(3) The number of the stackable resin portions 3 is three, and these three stackable resin portions 3 project radially outwardly relative to the cylindrical peripheral wall 2*d* of the wheel receiving portion 2*c*, which is configured into the cylindrical tubular form and is closed with the bottom wall 2*e* at the bottom end to receive the worm wheel 6. Therefore, the one-piece resin components 4 can be effectively and stably stacked one after another at the good balance. Furthermore, in the molding step, the molten resin material can be effectively and easily supplied to the wheel receiving portion molding part 31*c* of the cavity 31 of the die 10, which forms the wheel receiving portion 2*c*. Thus, the wheel receiving portion 2*c* can be appropriately molded. Specifically, in the case where the stackable resin portions 3 are absent, the molten resin material may possibly not be sufficiently filled in the wheel receiving portion molding part 31*c*, which forms the wheel receiving portion 2*c*, unless the various molding conditions (e.g., the injection pressure of the molten resin material, the temperature of the molten resin material, the temperature of the molding die) are precisely controlled. However, according to the present embodiment, the three stackable resin portion molding parts 31*d* are formed in the cavity 31 to mold the stackable resin portions 3 and are radially outwardly extended relative to the wheel receiving portion molding part 31*c*. When the molding conditions are not precisely controlled, the short-shot may possibly occur in the stackable resin portion molding parts 31*d*, in which the stackable resin portions 3 are molded, while allowing the effective and smooth filling of the molten resin material into the wheel receiving portion molding part 31*c* without causing the short-shot therein. Since the stackable resin portions 3, which are molded in the stackable resin portion molding parts 31*d*, are not the functional portions in the final product of the dynamoelectric machine, the occurrence of the short-shot in the stackable resin portion molding parts 31*d* will not be the critical defect as long as the short-shot does not occur in the rest of the cavity 31. Therefore, without requiring the precise control of the molding conditions, the molten resin material can be effectively and smoothly filled in the wheel receiving portion molding part 31*c*, which is the important functional portion in the final product of the dynamoelectric machine, while avoiding the occurrence of the short-shot in the wheel receiving portion molding part 31*c*. This is also true for the other functional portions (the motor fixation portion 2*a* and the worm receiving portion 2*b*) of the final product of the dynamoelectric machine.

(4) At the assembling step of assembling the other components (e.g., the worm wheel 6) to the gear housing 2, the stackable resin portions 3, which implement the high stability of the gear housing 2 during the transporting step thereof, are used as the positional reference. Therefore, the other components can be assembled to the gear housing 2 in the stable manner.

(5) The engaging recess 3*c* and the engaging protrusion 3*d* are provided to the one end part and the other end part of the support column 3*b* of each stackable resin portion 3. Each adjacent two of the stacked one-piece resin components 4 are stacked one after another such that the engaging recesses 3*c* of the stackable resin portions 3 of one of the adjacent two of the stacked one-piece resin components 4 are engaged with the engaging protrusions 3*d* of the stackable resin portions 3 of the other one of the adjacent two of the stacked one-piece resin components 4 in the stacking direction (axial direction) to limit the disengagement therebetween (i.e., between the engaging recesses 3*c* and the engaging protrusions 3*d*) in the direction perpendicular to the stacking direction. Therefore, falling down of the stacked one-piece resin components 4 upon tilting of the stacked one-piece resin components 4 in the direction perpendicular to the stacking direction (the axial direction) can be advantageously limited.

(6) At the cutting step, the stackable resin portions 3 are cut off from the rest of the one-piece resin component 4. Therefore, the stackable resin portions 3 are absent in the final product of the dynamoelectric machine, so that it is possible to minimize the size of the dynamoelectric machine. Furthermore, the stackable resin portions 3, which are cut off from the one-piece resin component 4, can be recycled as, for example, the material of the one-piece resin component 4 once again. Thereby, the material costs of the one-piece resin component 4 can be minimized to minimize the entire manufacturing costs.

The above embodiment may be modified as follows.

Although not mentioned in the above embodiment, the one-piece resin component 4 may be configured to stand in a direction perpendicular to the axial direction of the one-piece resin component 4.

Figure 5:
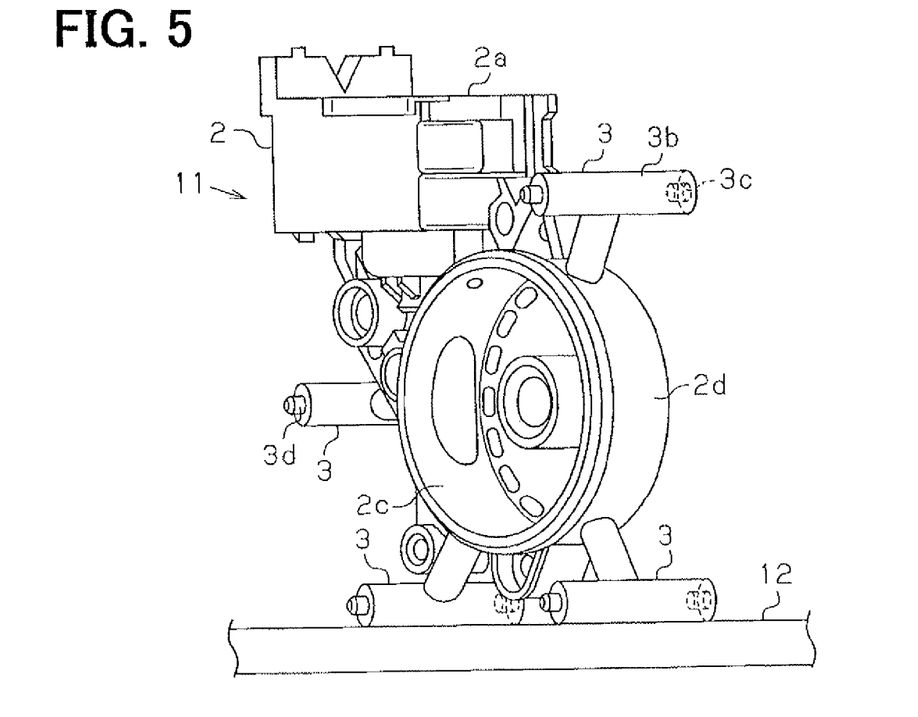
FIG. 5 is perspective view showing a modification of the one-piece resin component shown in FIGS. 1 to 4.

For instance, the one-piece resin component 4 of the above embodiment may be modified in a manner shown in FIG. 5. Specifically, in a one-piece resin component 11 shown in FIG. 5, the number of the stackable resin portions 3 is increased to four, and these four stackable resin portions 3 are radially outwardly projected relative to the cylindrical peripheral wail 2*d* of the wheel receiving portion 2*c*. Two of the stackable resin portions 3, which are located on the side opposite from the motor fixation portion 2*a*, are arranged such that these two stackable resin portions 3 can contact a planar base (horizontal plane) 12, which are generally parallel to the axial direction (the left-to-right direction in FIG. 5) of the one-piece resin component 11, to hold the one-piece resin component 11 in a standing position, in which the one-piece resin component 11 is self-supported, i.e., stands on the planar base (horizontal plane) 12 in the direction perpendicular to the stacking direction, i.e., the axial direction while maintaining the axial direction of the one-piece resin component 11 generally parallel to the planar base (horizontal plane) 12. In this instance, the installation side of the motor fixation portion 2*a*, to which the motor housing 5*a* of the motor main body 5 (see FIG. 1) is installed, is directed upward away from the planar base (horizontal plane) 12. Therefore, for example, in the state where the one-piece resin component 11 is held by the two stackable resin portions 3 to stand in the direction perpendicular to the axial direction of the one-piece resin component 11, the motor main body 5 (see FIG. 1) can be installed (in the assembling step) to the gear housing 2 (more specifically, the motor fixation portion 2a) while the two stackable resin portions 3 serving as the positional reference.

In the above embodiment, the resin housing is the gear housing 2, which receives the gears (the worm and the worm wheel 6). However, the present invention is not limited to this. For example, the motor housing 5a or any other resin housing of the dynamoelectric machine, such as a housing receiving an electric component(s), can be used as the resin housing of the present invention, if desired.

In the above embodiment, the three stackable resin portions 3 are provided to radially outwardly project relative to the cylindrical peripheral wall 2d of the wheel receiving portion 2c, which is configured into the cup shape body (the cylindrical body having the bottom). Alternatively, as long as the stackable resin portions 3 radially outwardly project from the gear housing 2 (the resin housing) and enable the stacking of the one-piece resin components 4 in the axial direction (stacking direction), the stackable resin portions 3 may be modified to any other form. For example, one or more of the stackable resin portions 3 may be modified to project from the motor fixation portion 2a in a direction perpendicular to the axial direction. Furthermore, for example, the number of the stackable resin portions may be modified to two or five or any other appropriate number.

In the above embodiment, the assembling step of assembling the other components (e.g., the worm wheel 6) to the gear housing 2 is performed while using the stackable resin portions 3 as the positional reference. However, the present invention is not limited to this. Specifically, the stackable resin portions 3 may not be used as the positional reference. Furthermore, the cutting step may be performed before the assembling step of assembling the other components (e.g., the worm wheel 6) to the gear housing 2.

In the above embodiment, the engaging recess 3c and the engaging protrusion 3d are formed at the one end part and the other end part of the stackable resin portion 3 (more specifically, the support column 3b) to engage with the engaging protrusion 3d and the engaging recess 3c of the other stackable resin portions 3 in the axial direction (stacking direction). However, as long as it is possible to limit the falling down of the stacked one-piece resin components 4 upon tilting of the stacked one-piece resin components 4 in the direction perpendicular to the stacking direction (the axial direction), the engaging recess 3c and the engaging protrusion 3d of the stackable resin portion 3 (more specifically, the support column 3b) may be modified to any other type of engaging parts. Also, the engaging parts (i.e., the engaging recess 3c and the engaging protrusion 3d) may be eliminated from the stackable resin portion 3. In such a case, a partition(s) should be provided in the inside of the transfer case to limit the tilting or wobbling of the stacked one-piece resin components in the direction perpendicular to the stacking direction (the axial direction) of the stacked one-piece resin components, or the stacks of the stacked one-piece resin components should be arrayed in the rows in the direction perpendicular to the stacking direction (the axial direction) of the stacked one-piece resin components in such a manner that the stacked one-piece resin components of one stack contact the stacked one-piece resin components of the adjacent stack.

In the above embodiment, the cutting step is provided to cut off the stackable resin portions 3 from the rest of the one-piece resin component 4 after the transferring step. However, the present invention is not limited to this. Specifically, the cutting step may be eliminated, and the stackable resin portions 3 may be left in the final product of the dynamoelectric machine. Furthermore, in the above embodiment, the removed stackable resin portions 3, which are cut off from the rest of the one-piece resin component 4, are recycled. However, the present invention is not limited to this. That is, the removed stackable resin portions 3, which are cut off from the rest of the one-piece resin component 4, may be disposed without recycling the removed stackable resin portions 3.

Also, the dynamoelectric machine of the present invention is not limited to the geared electric motor or another type of electric motor. Specifically, the dynamoelectric machine of the present invention may be, for example, an electric generator having a housing.

Additional advantages and modifications will readily occur to those skilled in the art. The invention in its broader terms is therefore not limited to the specific details, representative apparatus, and illustrative examples shown and described.

What is claimed is:

1. A one-piece resin component for a dynamoelectric machine, comprising:
   a resin housing, which is configured to form at least a part of a housing of the dynamoelectric machine; and
   a plurality of stackable resin portions, which are formed integrally with the resin housing and radially outwardly project from the resin housing, wherein each of the plurality of stackable resin portions is adapted to be stacked in a stacking direction against a corresponding one of a plurality of stackable resin portions of another one-piece resin component that is generally identical to the one-piece resin component, wherein
   the resin housing is a gear housing that includes a wheel receiving portion, which is adapted to receive a worm wheel of the dynamoelectric machine at a location radially inward of a cylindrical peripheral wall of the wheel receiving portion,
   a first engaging part and a second engaging part are formed in one end part and the other end part, respectively, of each of the plurality of stackable resin portions of the one-piece resin component, and
   one of the first engaging part and the second engaging part of each of the plurality of stackable resin portions of the one-piece resin component is adapted to be axially engaged with a corresponding one of a first engaging part and a second engaging part, which are formed in one end part and the other end part, respectively, of a corresponding one of the plurality of stackable resin portions of the another one-piece resin component, to limit disengagement therebetween in a direction perpendicular to the stacking direction that is parallel to an axial direction of the wheel receiving portion of the one-piece resin component.

2. The one-piece resin component according to claim 1, wherein:
   one of the first engaging part and the second engaging part of each of the plurality of stackable resin portions of the one-piece resin component is an axial recess; and
   the other one of the first engaging part and the second engaging part of each of the plurality of stackable resin portions of the one-piece resin component is an axial protrusion.

3. The one-piece resin component according to claim 1, wherein the first engaging part and the second engaging part of each of the plurality of stackable resin portions of the one-piece resin component are axially placed outside of an axial extent of the cylindrical peripheral wall of the wheel receiving portion.

4. A manufacturing method, comprising:
molding a plurality of one-piece resin components from a resin material, wherein each of the plurality of one-piece resin components includes:
a resin housing, which is configured to form at least a part of a housing of a dynamoelectric machine; and
a plurality of stackable resin portions, which are formed integrally with the resin housing and radially outwardly project from the resin housing; and
transferring the plurality of one-piece resin components after the molding thereof in a stacked state, in which the plurality of one-piece resin components is stacked in a stacking direction by stacking each of the plurality of stackable resin portions of each of the plurality of one-piece resin components against a corresponding one of the plurality of stackable resin portions of an adjacent one of the plurality of one-piece resin components, wherein
the molding of the plurality of one-piece resin components includes molding a first engaging part and a second engaging part in one end part and the other end part, respectively, of each of the plurality of stackable resin portions of each of the plurality of one-piece resin components, and
the transferring of the plurality of one-piece resin components includes stacking the plurality of one-piece resin components such that each adjacent two of the plurality of one-piece resin components are stacked one after another such that the first engaging parts of the plurality of stackable resin portions of one of the adjacent two of the plurality of one-piece resin components are engaged with the second engaging parts of the plurality of stackable resin portions of the other one of the adjacent two of the plurality of one-piece resin components in the stacking direction to limit disengagement therebetween in a direction perpendicular to the stacking direction.

5. The manufacturing method according to claim 4, wherein the resin housing of each of the plurality of one-piece resin components is a gear housing that is adapted to receive a gear of the dynamoelectric machine therein.

6. The manufacturing method according to claim 5, wherein:
the gear housing of each of the plurality of one-piece resin components has a wheel receiving portion that is adapted to receive a worm wheel as the gear of the dynamoelectric machine and includes a cylindrical peripheral wall, which axially extends from a bottom wall of the wheel receiving portion to receive the worm wheel therein; and
the plurality of stackable resin portions of each of the plurality of one-piece resin components includes at least three stackable resin portions, which radially outwardly project relative to the cylindrical peripheral wall and are circumferentially arranged one after another.

7. The manufacturing method according to claim 4, further comprising assembling another component of the dynamoelectric machine to the resin housing of each of the plurality of one-piece resin components while using the plurality of stackable resin portions of the one-piece resin component as a positional reference.

8. The manufacturing method according to claim 4, wherein the plurality of stackable resin portions of each of the plurality of one-piece resin components is configured to enable standing of the one-piece resin component in a direction generally perpendicular to the stacking direction.

9. The manufacturing method according to claim 4, further comprising cutting off the plurality of stackable resin portions from the rest of each of the plurality of one-piece resin components after the transferring of the plurality of one-piece resin components.

10. The manufacturing method according to claim 4, wherein the molding of the plurality of one-piece resin components includes molding each of the plurality of one-piece resin components in a corresponding cavity of a molding die that includes a resin housing molding part, in which the resin housing is molded, and a plurality of stackable resin portion molding parts, in which the plurality of stackable resin portions is molded, by injecting a molten resin material into the cavity through a gate of the molding die, which is located adjacent to the cavity, while at least one of the plurality of stackable resin portion molding parts is placed furthermost from the gate in the cavity.

* * * * *